Inventor:
Edward T. Adams,
By   [signature]
    Attorney.

Patented May 2, 1933

1,907,095

UNITED STATES PATENT OFFICE

EDWARD T. ADAMS, OF PHOENIX, ARIZONA, ASSIGNOR TO FAIRBANKS, MORSE & CO., OF CHICAGO, ILLINOIS, A CORPORATION OF ILLINOIS

INTERNAL COMBUSTION ENGINE

Application filed November 3, 1921. Serial No. 512,518.

The invention relates to improvements in internal combustion engines, designed to burn oil fuels, especially the heavier grades of mineral oils, tar oils and the like.

The object of the invention is to provide new and improved method and means for delivering the fuel to the combustion or clearance space in the engine cylinder in a manner to insure the maximum of efficiency of combustion thereof.

This invention is a development and improvement on the method and means described and claimed in my copending application filed October 26, 1920, Serial No. 419,698.

The invention comprises improved method and means whereby the heavy fuel is projected into the cylinder clearance space in a manner producing turbulence, thereby creating a thorough mixture of the oil and air, or other gases in said clearance space.

Referring to the drawing which illustrates, merely by way of example, preferred embodiments of my invention;

Similar numerals refer to similar parts throughout the several views.

Figure 1:
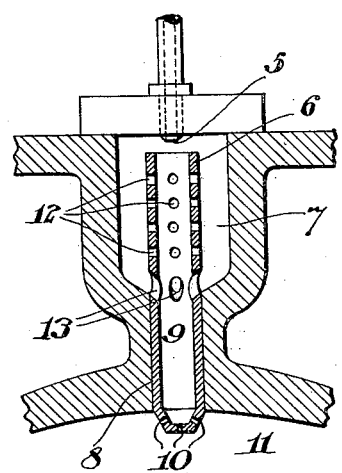
Fig. 1 is a sectional view.

Referring by numerals to Fig. 1, 14 designates, generally, a portion of an engine cylinder head in which is formed a precombustion chamber 7 having an outer interior portion of substantially cylindrical shape, and a lower interior portion 15 of substantially inverted frusto-conical shape. Obviously, the cylinder head 14 forms an upper or outer continuation of the power cylinder of the engine. The chamber 7 is formed integrally with the cylinder head and connected thereto by means of a neck portion 16 of relatively reduced diameter, in which is provided a bore 17 arranged coaxially with respect to the chamber 7. A tube member 6 is provided with an extension or tubular liner 8 which is firmly positioned in the bore 17 of the neck 16. This liner is provided with a plurality of openings 10 to permit communication between a passage 9 within the tube 6, and a main combustion or clearance space 11 which, it will be understood, exists interiorly of the engine cylinder, between the head, and the piston, (not shown). A portion 19 of the tube 6 is extended into the interior of the precombustion chamber 7, this extended portion having a plurality of restricted openings 12, and thus is perforated over that portion of its length which lies within the precombustion chamber. A plurality of larger passages 13 are formed in the tube 6, these openings being disposed at the extreme lower or inner portion of the chamber 7 and are, by preference, inclined downwardly in alignment with wall portions 15 of the chamber.

A fuel injection device 5 is disposed coaxially with respect to the chamber 7, and is arranged to discharge atomized fuel into the interior of the tube 6. It will be readily seen that the tube 6 divides the precombustion chamber into two compartments or zones for a purpose hereinafter appearing.

The operation

When a spray of oil issues from the nozzle 5, the major portion is discharged through the tube 6 into the passage 9 which due to the relatively restricted diameter and quantity of air present forms a zone of greater fuel concentration. To facilitate this action, the tube 6 or the path of travel from 5 to 9 is of moderate length. A small portion of this spray escapes at the top of the tube 6 and through the openings 12 and 13 into chamber 7 which produce a zone of lesser fuel concentration; the amount being so regulated by the size and number of said openings, relatively to the dimensions of the chamber, as to make a good burning mixture in chamber 7. The purpose of combustion of this mixture in chamber 7, is to produce flame and a pressure in excess of the normal pressure in the clearance space 11. The flame is projected through the openings in tube 6, and especially through the larger openings 13. The pressure generated in the chamber 7 follows it up and clears the passage 9, driving everything out into the clearance space 11, where it is completely burned.

The function of this pressure, discharging especially through ports 13, passage 9 and ports or vents 10, is to create turbulence, a thorough mixing of the oil and gases issuing from passage 9, with the air in the clearance space 11. It is also to be noted that flame is generated in chamber 7 and is projected through the openings into tube 6 and passage 9, especially through the larger openings 13, which are especially designed for the purpose, and are so formed as to direct the flow of flame to the passage 9, to and through the outlets 10. There is not air enough in the tube 6 and passage 9 to support complete combustion, the mixture is far too rich. Obviously, the tube 6 provides a means for dividing the fuel charge within the precombustion chamber into zones of lesser and greater fuel concentration.

The theory of operation is that the jets of flame shoot down through the oil spray in passage 9, and out through the holes 10. The tube 6 is at, or near a red heat.

By the arrangement herein described, the passage 9 is fairly long so that, as it is believed, the oil spray is concentrated in said passage 9, and the flame and pressure generated in the chamber 7 pass through it. The tube portion 6 and the passage 9 are made about the same length, the tube rather short, in order that the spray may get promptly to the passage 9. The latter passages preferably not too short, in order to give an opportunity for the gas pressure and the flame jets to have their effect. The chamber 7 is a pressure chamber and the openings 10 at the bottom of passage 9 are distributing channels.

Figure 2:
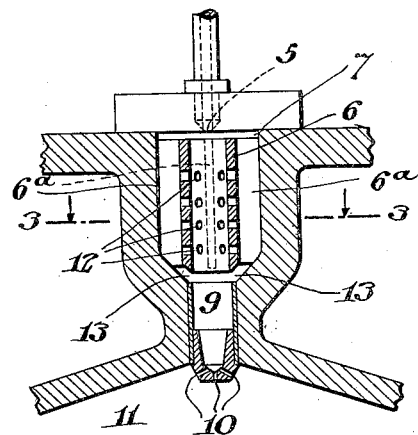
Fig. 2 is a similar view showing modifications in the structure.
Figure 3:
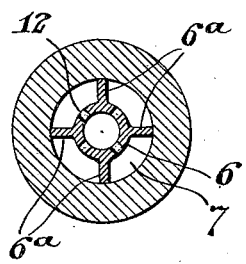
Fig. 3 is a cross-section on line 3—3 of Fig. 2.

In the alternative structure, shown in Figs. 2 and 3, the tube 6 is separated from the passage 9. It is provided with the wings 6ª for properly positioning and supporting the tube 6 in chamber 7. The operation however is substantially the same: the important features include the openings 12 through which a portion of the oil spray escapes into chamber 7, and through which flame jets may enter from chamber 7 into tube 6, and the ample communication or passage 13, at the bottom of chamber 7 into passage 9 also to permit the escape of some oil spray into chamber 7, and to permit pressure and heat and flame jets to be projected downwardly into the oil spray in passage 9, to force the mixture of gas and oil, with turbulence, through ports or channels 10, into the clearance space 11.

Figure 4:
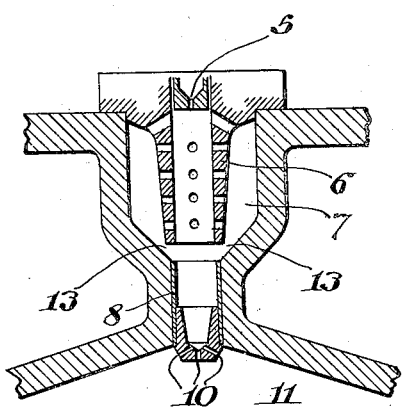
Fig. 4 is a sectional view showing further modifications in the structure.

In the structure shown in Fig. 4, the tube 6 is supported at the top, and ends near the bottom of chamber 7. A passage or space 13 is provided between its lower end and the bottom of chamber, as in Fig. 2. The operation is similar to that described with respect to Fig. 2.

In all cases, it will be noted, the bottom of chamber 7 is inclined toward the passage 9; that is, funnel shaped—and the passage 13 is so formed, between tube 6 and passage 9 or the bottom of chamber 7, as to provide a free and unobstructed path of travel directed toward the engine clearance. From this it results that the pressure developed in 7 will make a clean sweep of fuel from the bottom of 7 into passage 9.

There is probably complete combustion in chamber 7, and there is some degree of partial combustion in tube 6 and there is a mixture and violent projection into cylinder or clearance space 11.

What I claim is:—

1. In an internal combustion engine adapted to burn oil, a cylinder having a combustion space at its outer end, consisting of a cylinder clearance, a precombustion chamber co-axial with the cylinder, said chamber defined by walls having an outer interior surface portion of substantially cylindrical shape and an innermost interior surface portion of substantially inverted frusto-conical shape, an injection nozzle coaxial with the precombustion chamber, and disposed at its outer end, a neck of a diameter less than that of the cylindrical portion of the precombustion chamber, and corresponding substantially to the smaller diameter of the frusto-conical part of the chamber, said neck connecting the precombustion chamber and the cylinder, a liner member positioned in the neck, a perforate closure at the inner end of the liner, providing restricted communication between the neck and clearance; a perforate partition disposed centrally of the precombustion chamber and coaxially with said liner member and arranged to define two concentric annular spaces within said chamber, the innermost surfaces of said chamber and perforate partition being similarly sloped to constitute a fuel channel of sloping trend, directed along the frusto-conical surface of the outermost of said annular spaces, and into said neck.

2. In an internal combustion engine adapted to burn oil, a cylinder having a combustion space at its outer end, consisting of a cylinder clearance and a precombustion chamber coaxial with the cylinder, said chamber defined by walls having an outer interior surface portion of substantially cylindrical shape, and an innermost interior surface portion of substantially inverted frusto-conical shape, an injection nozzle coaxial with the precombustion chamber, a neck connecting the precombustion chamber and the cylinder clearance, and of a diameter less than the diameter of the said cylindrical portion, and of substantially the same diameter as the smaller base of the frusto-conical portion of the chamber, a liner positioned in the neck, and defining a passage therethrough, a hollow, perforate element dividing the cylindrical chamber portion into inner and outer concentric chambers, the perforate element being axially and centrally disposed within the chamber, and having an inner surface forming, with the frusto-conical surface of the chamber, an inwardly inclined fuel discharge channel disposed at the innermost portion of the chamber, and directed from said outer concentric chamber into said neck.

3. In an internal combustion engine the combination with a cylinder of a combustion space including a cylinder clearance and a precombustion chamber coaxial with the cylinder, the chamber walls defining an outer cylindrical portion and an inner funnel-shaped base, a perforate partition disposed centrally within, and coaxially of, the cylindrical portion of the chamber, and spaced inwardly of the chamber wall, the inner end of the partition having a portion of its wall spaced above the said funnel-shaped base, and so forming therewith an inwardly inclined fuel-discharge channel at the innermost portion of the precombustion chamber, a neck providing a passageway from the precombustion chamber, to the clearance, a liner for said neck, a perforate, partial closure carried by the innermost end of the liner, providing for restricted communication between said neck and said clearance, said inwardly inclined fuel discharge channel extending from the chamber space between said partition and the chamber wall, thence parallel to the inner surface of the funnel-shaped base, and into said neck, whereby the channel is adapted completely to evacuate the outer portion of said chamber.

4. In an internal combustion engine the combination of a cylinder having a combustion space at its outer end, consisting of a cylinder clearance and a precombustion chamber coaxial with said cylinder, said precombustion chamber being defined by walls having a cylindrical outer interior surface portion, and a substantially inverted frusto-conical innermost surface portion, a charge-dividing tube having perforate walls, and disposed coaxially and centrally of the chamber, extending over the greater part of the interior length of the chamber, and dividing the cylindrical portion of the precombustion chamber into two concentric annular chambers, an injection nozzle opening into the outer end of said tube, a neck having a passageway connecting the precombustion chamber to the clearance, a liner for said neck, defining the passage therethrough and being of a diameter less than the diameter of the cylindrical portion of the precombustion chamber and substantially equal to the lesser base diameter of the said frusto-conical chamber portion, the innermost end of said charge-dividing tube terminating short of the frusto-conical surface of the precombustion chamber and extending parallel thereto, whereby said surfaces form a fuel-clearing channel at the innermost or discharge end of the chamber, and extending from the outermost concentric annular chamber portion, into the neck, and means providing restricted communication between said neck passage and the cylinder clearance.

EDWARD T. ADAMS.